United States Patent
Uchida et al.

(10) Patent No.: US 7,400,820 B2
(45) Date of Patent: Jul. 15, 2008

(54) SIGNAL PROCESSING APPARATUS AND SIGNAL PROCESSING METHOD FOR LOCATING A LOST POSITION OF AUXILIARY DATA

(75) Inventors: Hirofumi Uchida, Osaka (JP); Tatsushi Bannai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1129 days.

(21) Appl. No.: 10/127,863

(22) Filed: Apr. 22, 2002

(65) Prior Publication Data

US 2002/0172154 A1    Nov. 21, 2002

(30) Foreign Application Priority Data

Apr. 27, 2001   (JP)   ............................. 2001-131416

(51) Int. Cl.
    *H04N 5/91*    (2006.01)
    *H04N 7/00*    (2006.01)
    *H04N 7/12*    (2006.01)
(52) U.S. Cl. ...................................... 386/98; 348/423.1
(58) Field of Classification Search .................. 386/27, 386/29, 33, 64, 95, 98, 131; 348/423.1
    See application file for complete search history.

(56) References Cited

U.S. PATENT DOCUMENTS

| | | | | |
|---|---|---|---|---|
| 4,866,719 A * | 9/1989 | Morgan et al. | ............... | 714/704 |
| 5,598,530 A * | 1/1997 | Nagae | ......................... | 714/21 |
| 5,731,847 A | 3/1998 | Tsukagoshi | | |
| 5,832,085 A * | 11/1998 | Inoue et al. | .................. | 386/124 |
| 6,052,246 A * | 4/2000 | Higurashi et al. | ............. | 360/48 |
| 6,075,920 A | 6/2000 | Kawamura et al. | | |
| 6,188,438 B1 * | 2/2001 | Ueda | .......................... | 348/460 |
| 6,671,323 B1 * | 12/2003 | Tahara et al. | ............ | 375/240.26 |
| 6,791,620 B1 * | 9/2004 | Elswick et al. | .............. | 348/441 |
| 6,862,652 B1 * | 3/2005 | Tsuji | .......................... | 711/103 |

* cited by examiner

*Primary Examiner*—Thai Tran
*Assistant Examiner*—Daquan Zhao
(74) *Attorney, Agent, or Firm*—RatnerPrestia

(57) ABSTRACT

For conversion of a first video signal into a second video signal of a different format, a second auxiliary data packet is generated from a header carrying location data for multiplexing a first auxiliary data packet and main data of a first auxiliary data packet in the first video signal, and is multiplexed with the second video signal. For conversion from the second video signal into the first video signal, the first auxiliary data packet is generated from the header and the main data of the second auxiliary data packet, and multiplexed at the location determined by the location data in the first video signal.

36 Claims, 7 Drawing Sheets

SIGNAL PROCESSING APPARATUS AND SIGNAL PROCESSING METHOD FOR LOCATING A LOST POSITION OF AUXILIARY DATA

FIELD OF THE INVENTION

The present invention relates to a signal processing apparatus and a signal processing method for multiplexing video signals to be transmitted or recorded with auxiliary data.

BACKGROUND OF THE INVENTION

For transmission of video signals, a format of non-compressed video signals developed by the Society of Motion Picture and Television Engineers (SMPTE) 125M standard. FIG. 5 illustrates a 525/60 TV video signal, in which auxiliary data areas H, D, and V are capable of being multiplexed with auxiliary data. A full line period, except switching points, of video samples 1444 to 1711 is assigned as the auxiliary data area H. A period of video samples 0 to 1439 at lines after effective video area and before the switching point is assigned as the auxiliary data area V. And at lines after the switching point to succeeding effective video area is assigned as the auxiliary data area D.

A format of an auxiliary data packet to be multiplexed in the auxiliary data areas is shown in the SMPTE 291M standard. FIG. 6 illustrates the format of the auxiliary data packet of the SMPTE 291M standard where one word consists of 10 bits. As shown in FIG. 6, the auxiliary data packet includes three words (000h, 3FFh, and 3FFh) of an auxiliary data flag (ADF), one word of a data identification (DID), one word of second data identification (SDID), one word of a data count (DC), 0 to 255 words of a user data word (UDW), and one word of a check sum (CS).

Another format of a compressed video signal is shown in the SMPTE 314M standard. FIG. 7 illustrates a data structure of a 50M mode compressed video signal of the SMPTE 314M standard where hatching areas represents areas capable of being multiplexed with data. In either a digital interface (DIF) block data area in a video auxiliary (VAUX) section or a reserve data are in a video section, the data can be multiplexed. One word consists of 8 bits.

As the location where the auxiliary data packets are multiplexed in a non-compressed video signal is not particularly specified, the auxiliary data packets are hardly restored at their original location during the conversion of the compressed video signal into its non-compressed signal.

SUMMARY OF THE INVENTION

A signal processing apparatus and a signal processing method identify a location where auxiliary data packets are multiplexed in any converted format of a digital video signal.

The signal processing apparatus includes: a location data generator for generating a location data indicating a location where a first auxiliary data packet including a first header and first data is multiplexed in a video signal of a first format; a packet generator for generating a second auxiliary data packet including a second header carrying the location data and second data; and a multiplexing section for multiplexing the second auxiliary data packet in a video signal of a second format.

DETAILED DESCRIPTION OF THE PREFERRED EMBODIMENTS

Figure 1:
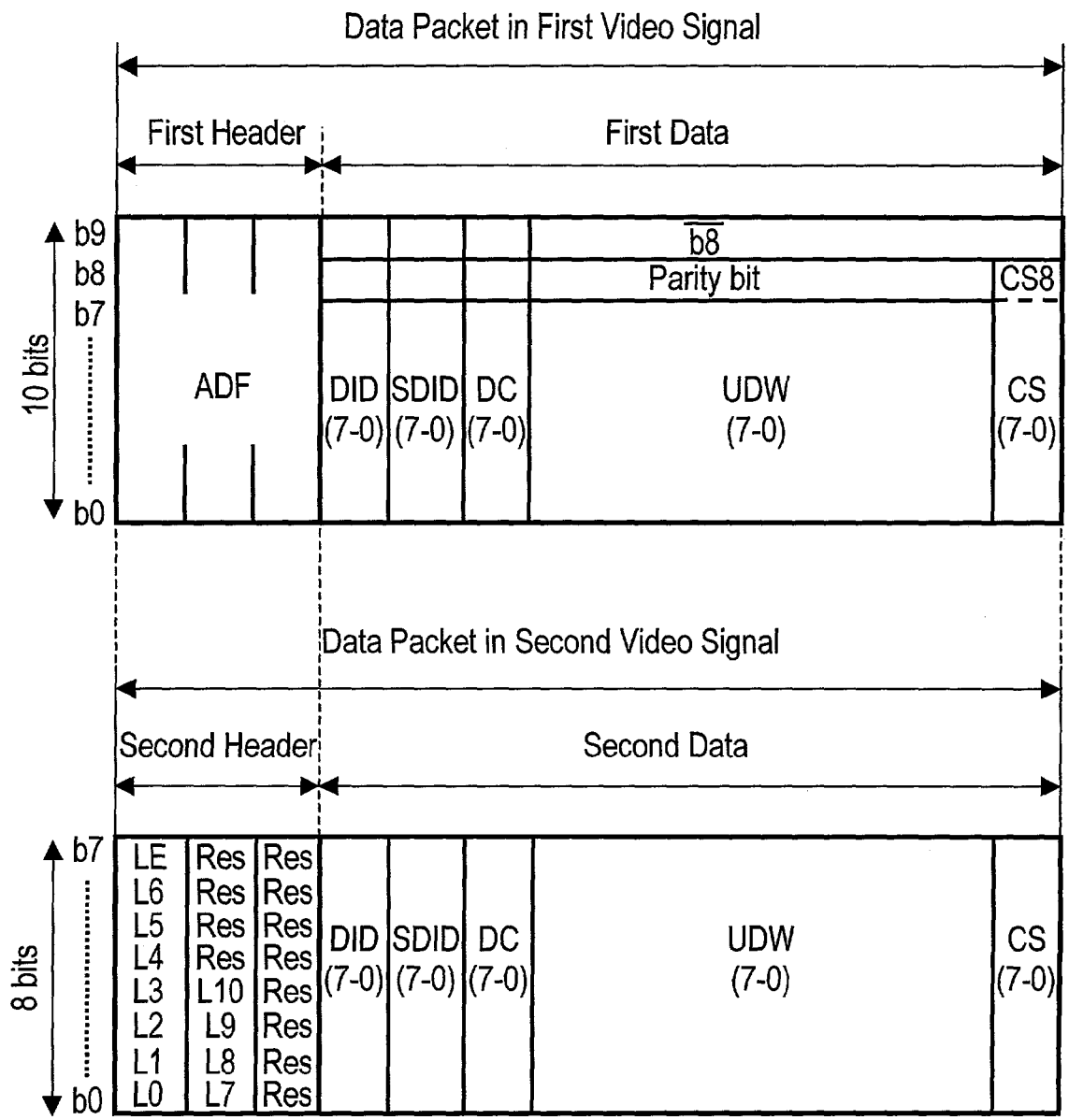
FIG. 1 illustrates a first auxiliary data packet and a second auxiliary data packet for a signal processing apparatus according to exemplary embodiments of the present invention.

FIG. 1 illustrates a first auxiliary data packet and a second auxiliary data packet for a signal processing apparatus according to exemplary embodiments of the present invention.

The first auxiliary data packet conforms to the SMPTE 291M standard and is arranged with one word consisting of 10 bits (b0 to b9). The first auxiliary data packet starts with a first header including an auxiliary data flag (ADF) of three words (00h, 3FFh, and 3FFh) for indicating the beginning of the packet. First data follows including one word of a data identification (DID), one word of second data identification (SDID), one word of a data count word (DC), 0 to 255 words of user data (UDW), and one word of a check sum word (CS). The data bit b8 in each of DID, SDID, DC, and UDW represents an even number parity for the bits b0 to b7. The data bit b9 is an inverse of the bit b8. The data bits b0 to b8 in CS represent the nine least bits in a sum of the data bits b0 to b8 of the nine least bits in the data from DID to UDW. The data bit b9 in CS is an inverse of the b8.

The second auxiliary data packet is an auxiliary data packet form of a compressed video signal conforming to the SMPTE 314M standard and is arranged with one word consisting of 8 bits. The second auxiliary data packet starts with a second header consisting of three words, and each word carries line bits LE to L10 of the first video signal and reserve bits (Res). A second data includes the eight least bits of DID, SDID, DC, and UDW in the first data.

Embodiment 1

A first embodiment of the present invention will now be described, in which a signal processing apparatus for generating an auxiliary data packet for a second video signal of a second format. The packet carries multiplexing location data in the first video signal, while a data structure of the auxiliary data packet is maintained in a first video signal of a first signal format.

Figure 2:
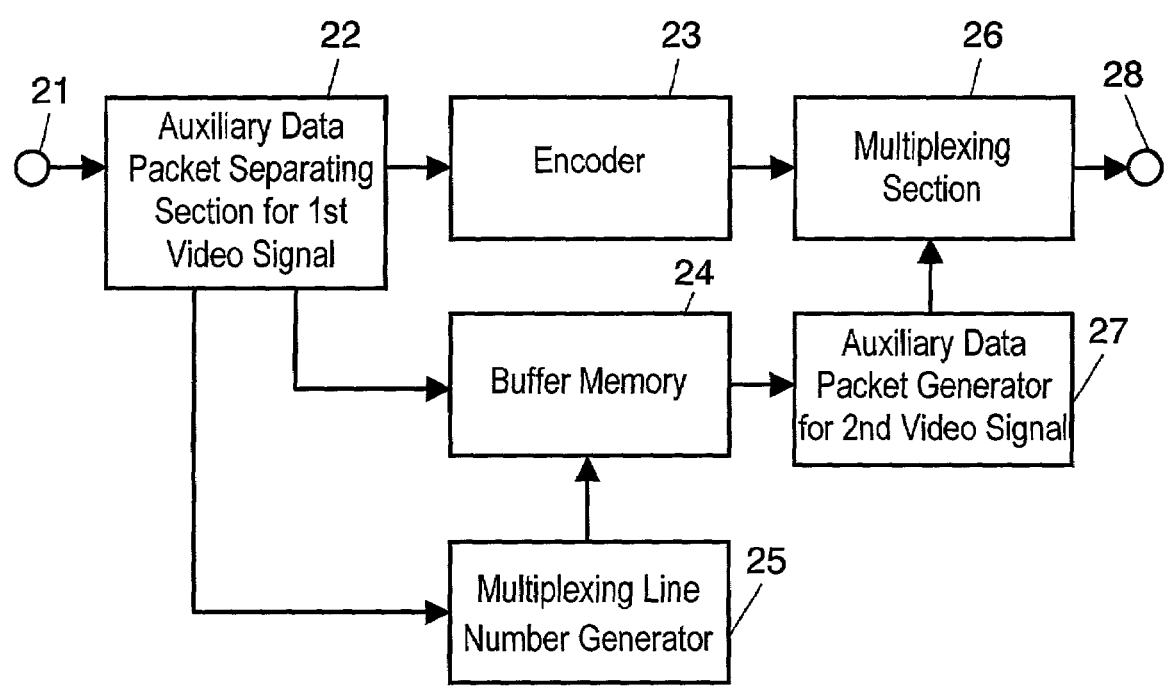
FIG. 2 is a block diagram of the signal processing apparatus according to Embodiment 1 of the invention.

FIG. 2 is a block diagram of the signal processing apparatus according to Embodiment 1. An input terminal 21 receives the first video signal. An auxiliary data packet separating section 22 for the first video signal detect and separates the auxiliary data packet multiplexed and carried in the auxiliary data area of the first video signal. An encoder 23 compresses the first video signal from which the auxiliary data packet has been separated by the auxiliary data packet separating section 22. A buffer memory 24 stores the auxiliary data packet separated by the auxiliary data packet separating section 22 together with their a line number generated by a multiplexing line number generator 25. The multiplexing line number generator (location data generator) 25 determines the number of a line (location data), which indicates the location of the auxiliary data packet in the auxiliary data area of the first video signal, from the location data extracted by the auxiliary data packet separating section 22 from the first video signal. A second video signal auxiliary data packet generator 27 generates an auxiliary data packet from the data stored in the buffer memory 24. A multiplexing section 26 multiplexes an encoded data generated by an encoder 23 and the auxiliary data packet generated by the auxiliary data packet generator 27 to develop a second video signal. An output terminal 28 releases the second video signal developed by the multiplexing section 26.

An operation of the signal processing apparatus having the above described arrangement will be described. The first video signal received at the input terminal 21 is a 525/60 format TV video signal conforming to the SMPTE 125M standard. More specifically, the first video signal is a digital video signal of a 10-bit word format. The first video signal carries the auxiliary data packet multiplexed in its auxiliary data area which are equal to the first auxiliary data packet of the SMPTE 291M standard shown in FIG. 1.

Figure 5:
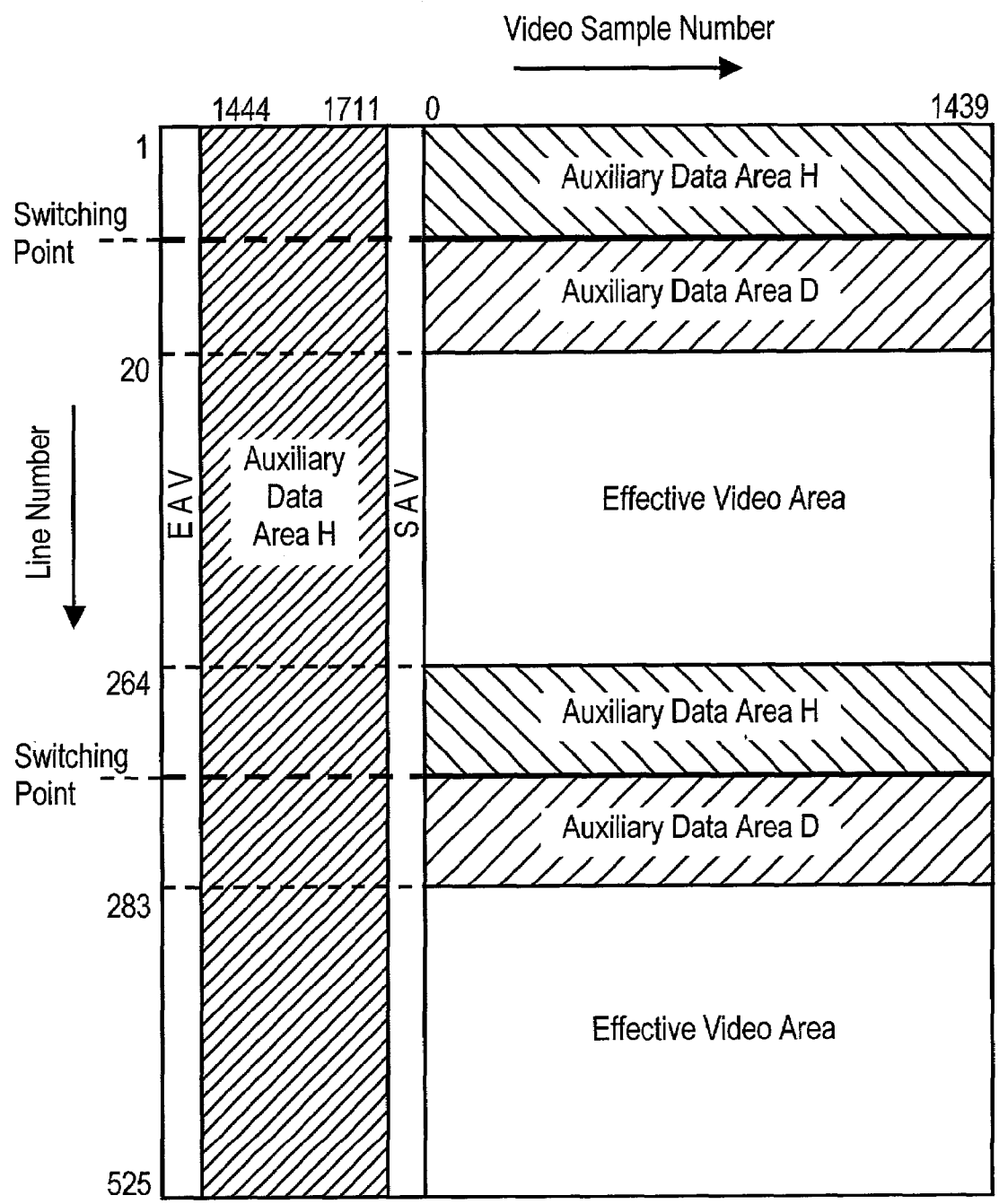
FIG. 5 illustrates auxiliary data multiplexing areas of a conventional 525/60 TV signal.
Figure 6:
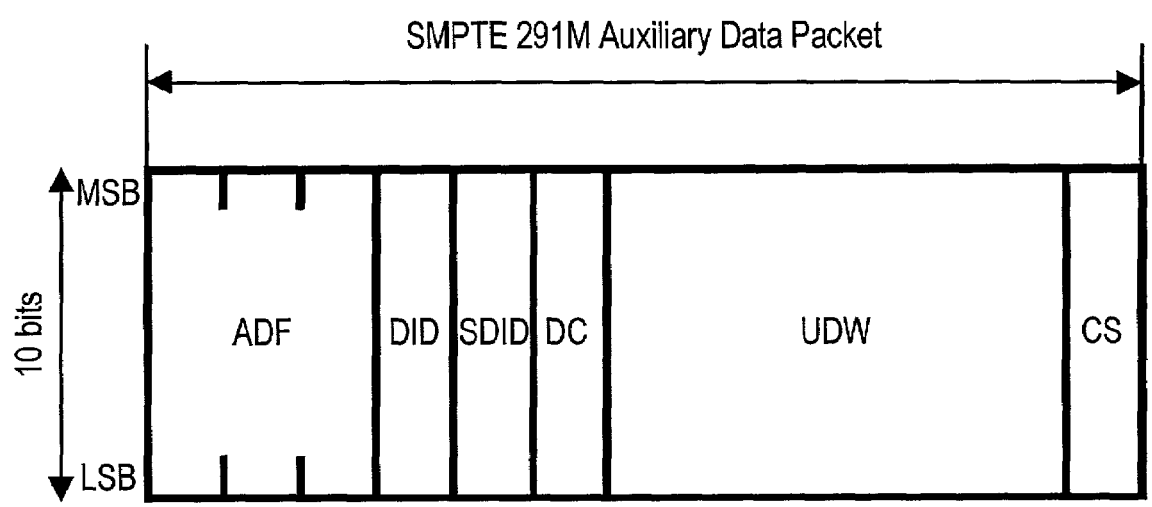
FIG. 6 illustrates a conventional auxiliary data packet conforming to the SMPTE 291M standard.
Figure 7:
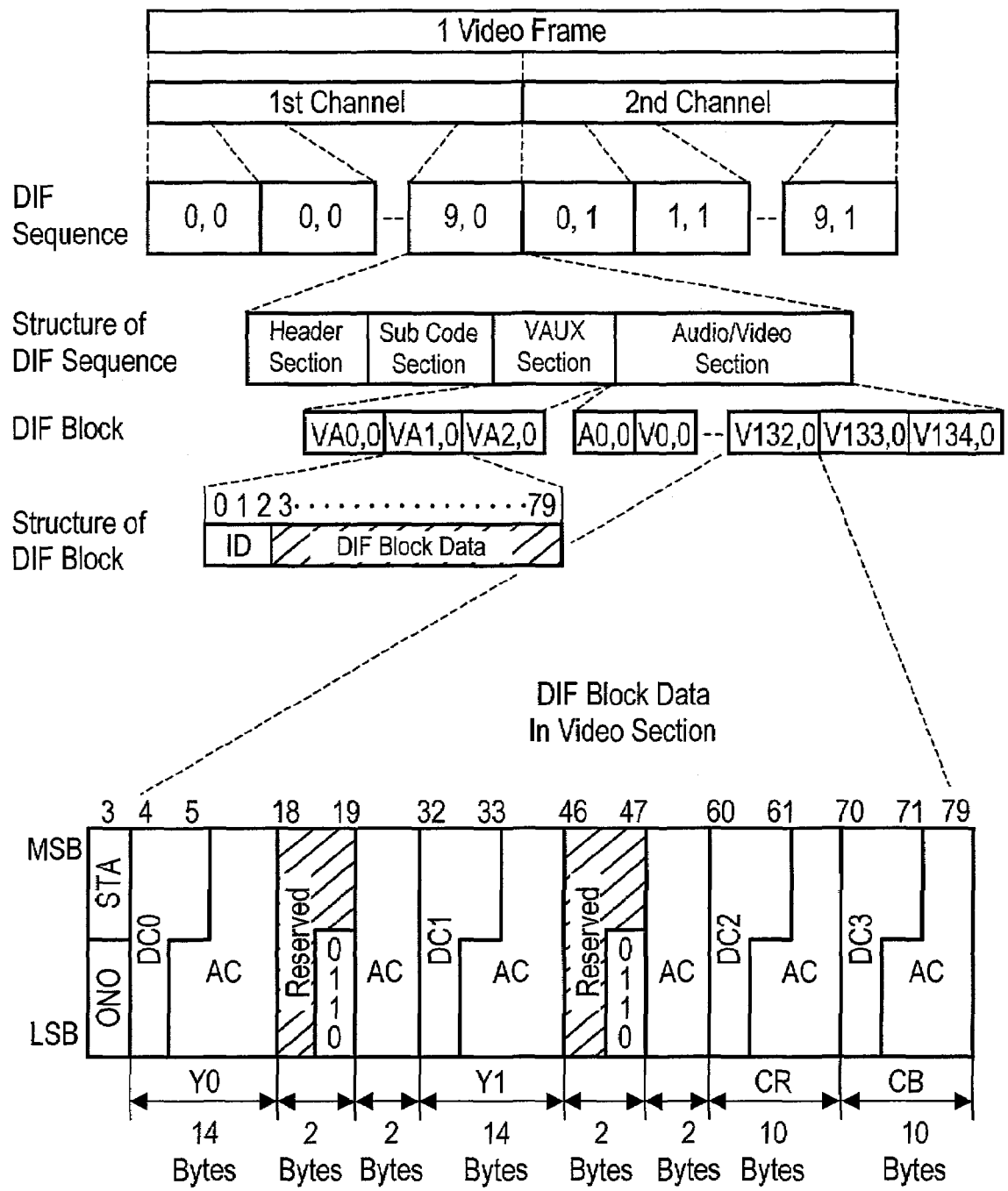
FIG. 7 illustrates auxiliary data multiplexing areas of a conventional video signal conforming to the SMPTE 314M standard.

The auxiliary data packet multiplexed and carried in the auxiliary data areas D shown in FIG. 5 is detected by the auxiliary data packet separating section 22. The eight least bits in the first data of each auxiliary data are transferred from the auxiliary data packet separating section 22 to the buffer memory 24, and their multiplexing line number data are simultaneously supplied to the multiplexing line number generator 25. Video data in an effective video data area of the first video signal shown in FIG. 5 is transferred from the auxiliary data packet separating section 22 to the encoder 23. The video data is then compressed by the encoder 23 before being released in a sequence corresponding to the second video signal. According to Embodiment 1, the second video signal is a 50M mode compressed video signal conforms to the SMPTE 314M standard, shown in FIG. 7. The video signal is based on one word consisting of 8 bits and includes DIF block data in its VAUX section or reserve data in its video section as the data multiplexing area denoted by hatching shown in FIG. 7.

The multiplexing line number generator 25 generates the second header of three words including a flag LE, a set of line numbers L0 to L10, and a reserve bit Res as shown in FIG. 1. The line numbers L0 to L10 represent the lines where the auxiliary data packet is multiplexed in the first video signal during the reverse-conversion from the second video signal to the first video signal. Therefore, the line numbers for multiplexing are essentially arranged identical to the line numbers in the original signal. If desired, the line numbers may be set to any corresponding line numbers different from the original line numbers. When the line number valid/invalid flag LE includes a valid code, the line numbers L0 to L10 are valid. When the flag LE indicates "invalid", any lines regardless of L0 to L10 can be assigned for multiplexing of the auxiliary data.

The buffer memory 24 stores one frame of the second header and the second data shown in FIG. 1. The auxiliary data packet generator 27 extracts the auxiliary data from the buffer memory 24 to generate the auxiliary data packet for the second video signal. The multiplexing section 25 multiplexes the auxiliary data packet in its data area denoted by the hatching shown in FIG. 7, and releases the second signal or resultant compressed video signal conforming to the SMPTE 314M standard from the output terminal 28.

The auxiliary data packet separating section 22 measures the total amount of data in the auxiliary data packet multiplexed in the first video signal. The amount of data is transferred via the buffer memory 24 and the auxiliary data packet generator 27 for the second video signal to the multiplexing section 26. Upon determining that the total amount of data in the auxiliary data packet is greater than the size of the data multiplexing area, the multiplexing section 26 imposes an overflow data indicating the occurrence of overflow in the video signal of the second signal format. For example, the overflow data may be multiplexed in the second header. The overflow data imposed by multiplexing can notify that the auxiliary data in a generated form of the first video signal is imperfect. The data provides the apparatus with an advantage where the imperfect signal can be inhibited from being outputted. The overflow data allows a user to generate desired ones of the received auxiliary data through the reverse conversion and to discard all the auxiliary data.

In the signal processing apparatus of Embodiment 1, the auxiliary data packet having the location data for multiplexing in the first video signal can be determined while the data structure of the auxiliary data packets in the first video signal remains unchanged. As a result, the auxiliary data packets can be restored at their desired location for reverse conversion into the first video signal.

Embodiment 2

Embodiment 2 of the present invention will be described, in which a signal processing apparatus which is capable of restoring an auxiliary data packet at a desired location when a second video signal converted from a first video signal by the signal processing apparatus of the embodiment is returned back to the first video signal form.

Figure 3:
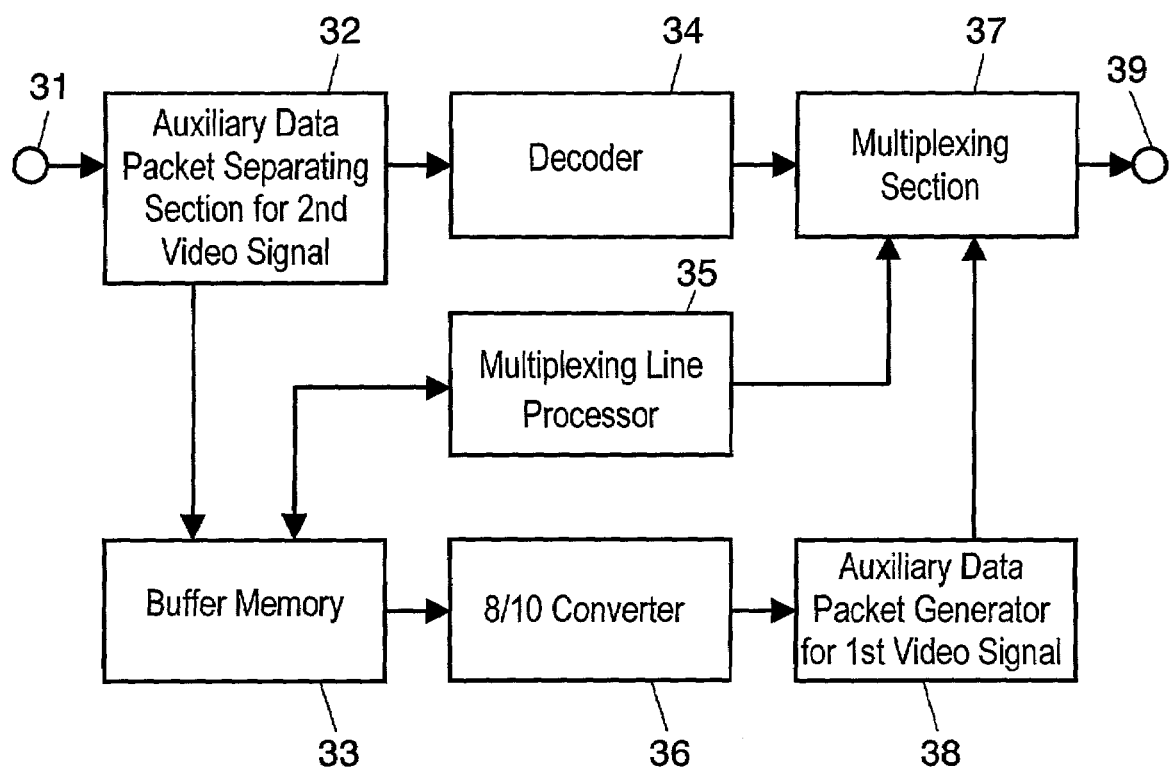
FIG. 3 is a block diagram of the signal processing apparatus according to Embodiment 2 of the invention.

FIG. 3 is a block diagram of the signal processing apparatus of Embodiment 2. An input terminal 31 receives the second video signal. A auxiliary data packet separating section 32 for the second video signal separates the auxiliary data packet multiplexed in a data area from the second video signal. A buffer memory 33 stores the auxiliary data packet received from the auxiliary data packet separating section 32. A decoder 34 decodes compressed data in the second video signal from which the auxiliary data packet have been separated by the auxiliary data packet separating section 32. A multiplexing line processor 35 controllably determines lines where the auxiliary data packet stored in the buffer memory 33 are assigned for multiplexing. An 8/10 converter 36 converts one word consisting of 8 bits in each auxiliary data packet stored in the buffer memory 33 into a 10-bit word. A multiplexing section 37, under a control of the multiplexing line processor 35, generates the first video signal by multiplexing the video data decoded by the decoder 34 with the auxiliary data packet received from a auxiliary data packet generator means 38 for the first video signal. The auxiliary data packet generator 38 for the first video signal generates the auxiliary data packet of the first video signal from the 10-bit output of the 8/10 converter 36. An output terminal 39 releases the first video signal generated by the multiplexing section 37. The 8/10 converter 36 and the auxiliary data packet generator 38 for the first video signal serve as a packet generating means.

An operation of the signal processing apparatus having the above described arrangement will be explained. The second video signal received at the input terminal 31 is a 50M mode compressed video signal conforming to the SMPTE 314M standard. The second or compressed video signal is a digital video signal based on one word consisting of 8 bits and arranged in which the auxiliary data packet shown in FIG. 1(b) is multiplexed in the data area denoted by hatching shown in FIG. 7.

The second video signal received at the input terminal 31 is transferred to the auxiliary data packet separating section 32 where the auxiliary data packet shown in FIG. 1(b) is separated before being delivered to the buffer memory 33. The second video signal from which the auxiliary data packet has been separated by the auxiliary data packet separating section 32 is transferred and decoded by the decoder 34. The decoder 34 releases the data in an effective video areas shown in FIG. 5.

The buffer memory 33 stores one frame of the auxiliary data packet. The multiplexing line processor 35 detects line numbers L0 to L10 and a line number valid/invalid flag LE in the second header of the auxiliary data packet stored in the buffer memory 33. Upon detecting that the line number valid/invalid flag LE includes an invalid code, the multiplexing line processor 35 drives the buffer memory 33 to supply, to the 8/10 converter 36, second data of the auxiliary data packet for multiplexing the auxiliary data packet in a desired line in an auxiliary data area D shown in FIG. 5. For example, the multiplexing line processor 35 controls the buffer memory 33 to align the auxiliary data packet in a sequence of lines after a switching point in the auxiliary data area D. When the flag LE includes a valid code, the multiplexing line processor 35 directs the buffer memory 33 to supply, to the 8/10 converter 36, the second data in the auxiliary data packet when the data is multiplexed in lines numbered from L0 to L10 in the auxiliary data area. In case that the flag includes an invalid code, the multiplexing line processor 35, by identifying the DID and SDID in the second data shown in FIG. 1(b), detects a particular auxiliary data packet to be multiplexed at its corresponding line, and may multiplex the packet in the corresponding line.

An operation of the 8/10 converter 36 converting the 8-bit auxiliary data packet to a 10-bit form will be explained referring to FIG. 1. Eight bits b0 to b7 of the input data shown in FIG. 1b are equal to bits b0 to b7 in the 10-bit data b0 to b9 shown in FIG. 1a. An even number parity for the data bits b0 to b7 is expressed by the bit b8 throughout the DID, SDID, DC, and UDW. The bit b9 is an inverse of the bit b8. In the CS, the bit b8 is equal to the ninth least bit of a sum of the bits b0 to b8 from the DID to the UDW while the bit b9 is an inverse of b8. The 10-bit data are generated by this manner to develop the first data shown in FIG. 1(a).

The first data generated by the 8/10 converter 36 is then added with an ADF of three words (000h, 3FFh, and 3FFh) by the auxiliary data packet generator 38 for the first video signal to develop the auxiliary data packet shown in FIG. 1(a). According to a control of the multiplexing line processor 35, the multiplexing section 37 generates the first video signal by multiplexing the auxiliary data packet at its desired location in the auxiliary data area D shown in FIG. 5. The first video signal generated is then released from the output terminal 39 as the 525/60 TV video signal.

According to Embodiment 2, the auxiliary data packet can be restored at its desired location when the second video signal is converted into the first video signal. Also, the check sum word CS may restore one extra bit as the bit b8. As the eight data bits b0 to b7 are identical to those in the input signal, any error carried in e.g. the UDW of the auxiliary data packet of the input signal can be detected through the check sum word CS.

The first and second auxiliary data packets have an identical number of words, in which the eight least bits of the check sums are identical, and the eight least bits of the auxiliary data are identical. This arrangement allows a simple apparatus to convert the auxiliary data including video control data mutually between 8 bit and 10 bit formats while the apparatus can detect an error.

Embodiment 3

Embodiment 3 of the present invention will be described, in which a signal processing apparatus where the auxiliary data packet of the second video signal is multiplexed for easy conversion of an auxiliary data packet of a second video signal into an auxiliary data packet of the first video signal.

Figure 4:
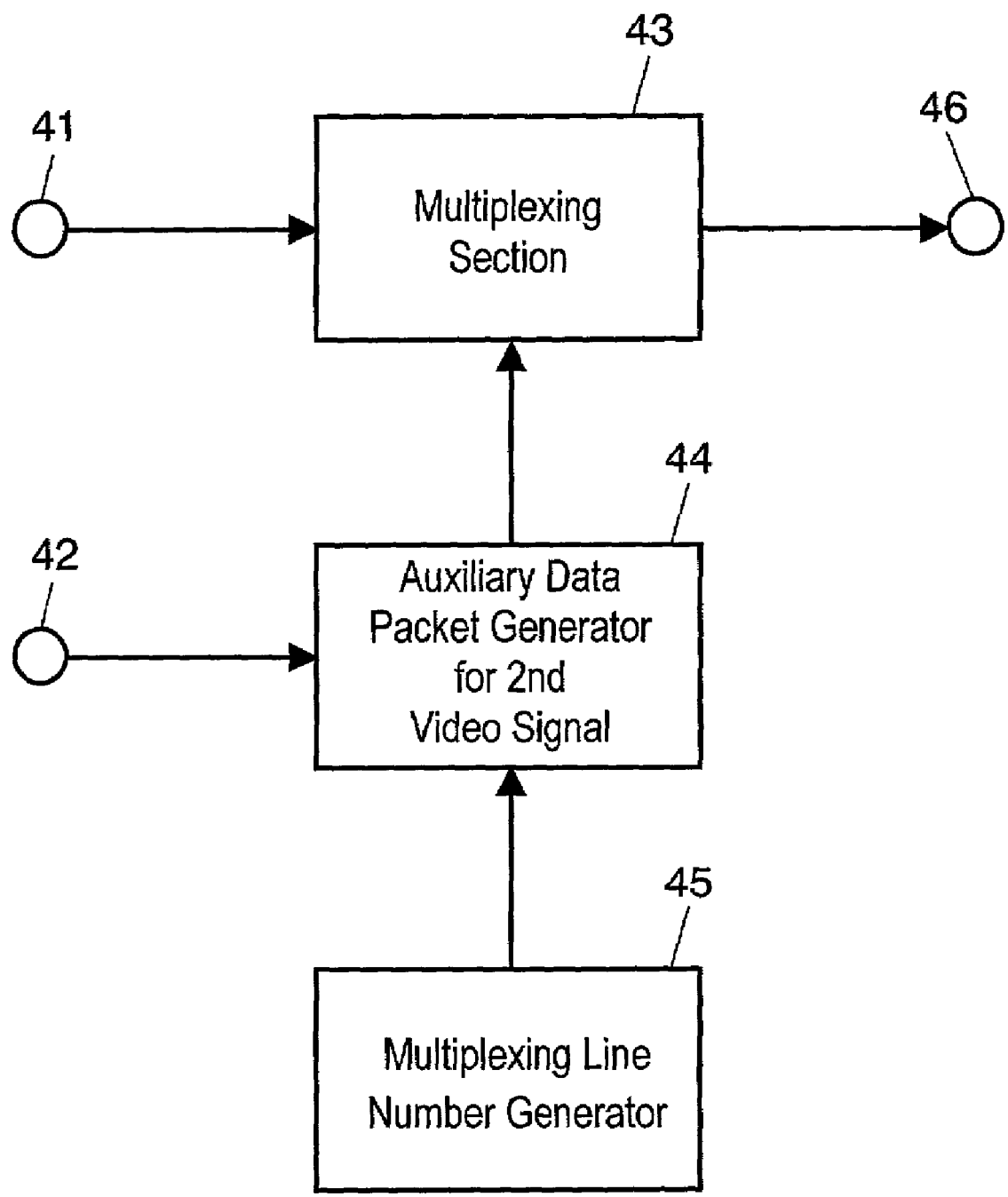
FIG. 4 is a block diagram of the signal processing apparatus according to Embodiment 3 of the invention.

FIG. 4 is a block diagram of the signal processing apparatus according to Embodiment 3. An input terminal 41 receives a compressed video signal, the second video signal, conforming to the SMPTE 314M standard. An input terminal 42 receives a second data in the auxiliary data packet of the second video signal shown in FIG. 1(b). A multiplexing section 43 multiplexes the second video signal received from the input terminal 41 with the auxiliary data packet generated by an auxiliary data packet generator 44 for the second video signal. The auxiliary data packet generator 44 generates the auxiliary data packet shown in FIG. 1(b) from the second data received from the input terminal 42 and its line number determined by a multiplexing line number generator 45. The multiplexing line number generator 45 restores the line number (location data) in a second header shown in FIG. 1(b). An output terminal 46 releases the second video signal, a compressed video signal, of the SMPTE 314M standard generated by the multiplexing section 43.

An operation of the signal processing apparatus having the above described arrangement will now be described.

The multiplexing line number generator 45 generates data in the second header shown in FIG. 1(b). It is assumed that a line number valid/invalid flag LE includes data "1" when being valid, and data "0" when being invalid. The flag LE in Embodiment 3 is set to "0" as an invalid code while the line numbers L0 to L10 are assigned with certain numbers. Reserve data Res is set to 1. The auxiliary data packet generator 44 generates data in the second head generated by the multiplexing line number generator 45 and adds the data to the second data received from the input terminal 42 to generate the auxiliary data packets shown in FIG. 1(b). The multiplexing section 43 multiplexes the auxiliary data packet in a predetermined sequence in the data multiplexing area of a VAUX section or a video section denoted by hatching shown in FIG. 7. Each blank in the data multiplexing area is filled with data "1". This allows the second header to be identified as the blank or the auxiliary data packet since the three-byte data in the second header shown in FIG. 1b is not (FFh, FFh, and FFh).

The signal processing apparatus of Embodiment 3 allows the auxiliary data to be multiplexed in the second video signal, a compressed video signal, conforming to the SMPTE 314M standard and thus easily converted back to a signal of the first video signal, a non-compressed 525/60 TV video signal.

In Embodiment 3, the multiplexing line number generator 45 is arranged with the line number flag being invalid (LE=0). The generator may generate the line number with the flag being valid (LE=1) so that the packet is assigned in an order of priority to the corresponding line. For example, the line number for the auxiliary data packet is predetermined to align the auxiliary data packet by priority after a switching point in an auxiliary data area D.

In the embodiments of the present invention, the video signal of the first format is defined as a 525/60 TV signal, and the video signal of the second format defined as a compressed video signal conforming to the SMPTE 314M standard for ease of the description. The video signal of the first format may be any other video signal such as 1125/60 TV signal with equal effect. Similarly, the video signal of the second format may be selected from any other compressed video signals or non-compressed video signals.

What is claimed is:

1. A signal processing apparatus comprising:
   an encoder for converting a video signal of a first format into a second video signal of a second format so that a relative position of first auxiliary data in said first format is lost;
   a location data generator for generating a location data indicating said relative position of said first auxiliary data in said first format;
   a packet generator for generating a second auxiliary data packet including a second header and second auxiliary data, the second header carrying the location data and a valid/invalid flag, the valid/invalid flag indicating that the location data is valid or invalid such that when the location data is valid the first auxiliary data is to be multiplexed at a first location in the video signal of the first format based on the location data carried by the second header and when the location data is invalid the first auxiliary data is to be multiplexed at a second location in the video signal of the first format determined regardless of the location data carried by the second header; and
   a multiplexing section for multiplexing the second auxiliary data packet in the video signal of the second format.

2. A signal processing apparatus according to claim 1, wherein the location data generator generates a line number for allowing a data packet to be multiplexed in the video signal of the first format in an order of priority of the data packet.

3. A signal processing apparatus according to claim 1, wherein the location data includes a line number of a predetermined line of the video signal of the first format.

4. A signal processing apparatus according to claim 1, wherein the location data includes data indicating an arbitrary line in an auxiliary data area of the video signal of the first format.

5. A signal processing apparatus according to claim 1,
   wherein each of a first header and the first data includes a word consisting of 10 bits,
   wherein each of the second header and the second data includes a word consisting of 8 bits, and
   wherein the second data includes eight least bits of the first data.

6. A signal processing apparatus according to claim 1, wherein the location data includes a location where a first auxiliary data packet including a first header and first data is multiplexed in the video signal of the first format.

7. A signal processing apparatus according to claim 1, wherein said relative position of said first auxiliary data changes.

8. A signal processing apparatus comprising:
   a packet separating section for separating, from a video signal of a first format, a first auxiliary data packet multiplexed in an auxiliary data area of the video signal of the first format, the first auxiliary data packet including a first header and first data;
   an encoder for converting the video signal of the first format into a second video signal of a second format so that a relative position of first auxiliary data in said first format is lost;
   a location data generator for generating location data indicating said relative position of said first auxiliary data in said first format;
   a packet generator for generating a second auxiliary data packet and a second header, the second auxiliary data packet including second auxiliary data, the second header carrying the location data and a valid/invalid flag, the valid/invalid flag indicating that the location data is valid or invalid such that when the location data is valid the first auxiliary data packet is to be multiplexed at a first location in the video signal of the first format based on the location data carried by the second header and when the location data is invalid the first auxiliary data packet is to be multiplexed at a second location in the video signal of the first format determined regardless of the location data carried by the second header; and
   a multiplexing section for multiplexing the second auxiliary data packet in the video signal of the second format converted from the first format.

9. A signal processing apparatus according to claim 8,
   wherein the packet separating section measures a total amount of data in the first auxiliary data packet, and
   wherein, when the packet separating section detects that the total amount of the data in the first auxiliary data packet is greater than an amount of data to be multiplexed in the video signal of the second format, the multiplexing section multiplexes overflow data indicating that the total amount is greater than the amount of the data to be multiplexed.

10. A signal processing apparatus according to claim 8, wherein the location data includes a line number of a predetermined line in the video signal of the first format.

11. A signal processing apparatus according to claim 8, wherein the location data includes data indicating an arbitrary line in the auxiliary data area of the video signal of the first format.

12. A signal processing apparatus according to claim 8,
   wherein each of the first header and the first data includes a word consisting of 10 bits,
   wherein each the second header and the second data includes a word consisting of 8 bits, and
   wherein the second data includes eight least bits of the first data.

13. A signal processing apparatus comprising:
   a decoder for restoring a video signal of a first format from a second video signal of a second format, the video signal of the first format having previously been converted into the second signal of the second format so that a relative position of first auxiliary data in said first format was lost;
   a packet separating section for separating a second auxiliary data packet from an auxiliary data area of a video signal of a second format, the second auxiliary data packet including second auxiliary data and a second header carrying location data and a valid/invalid flag, the location data indicating the relative position of the first auxiliary data in the first format, the valid/invalid flag indicating that the location data is valid or invalid such that when the location data is valid the first auxiliary data is to be multiplexed at a first location in the video signal of the first format based on the location data carried by the second header and when the location data is invalid the first auxiliary data is to be multiplexed at a second location in the video signal of the first format determined regardless of the location data carried by the second header;

a packet generator for generating a first auxiliary data packet from the second auxiliary data, the first auxiliary data packet including a first header and first auxiliary data; and a multiplexing section for multiplexing, according to the location data, the first auxiliary data packet in the video signal of the first format converted from the second format when the valid/invalid flag indicates the location data is valid.

14. A signal processing apparatus according to claim 13, further comprising:

a packet detector for detecting an auxiliary data packet in a specific line, wherein, when the packet detector detects a predetermined auxiliary data packet in a predetermined line, the multiplexing section multiplexes the predetermined auxiliary data packet in the predetermined line.

15. A signal processing apparatus according to claim 13, wherein each of the first header and the first data includes a word consisting of 10 bits, wherein each of the second header and the second data includes a word consisting of 8 bits, and wherein the packet generator generates the first data including a word consisting of 10 bits from the second data, and adds the first data to the first header to generate the first auxiliary data packet.

16. A signal processing apparatus according to claim 13, wherein the multiplexing section multiplexes, regardless of the location data, the first auxiliary data packet in the video signal of the first format converted from the second format when the valid/invalid flag indicates the location data is invalid.

17. A signal processing apparatus comprising:

an encoder for converting a video signal of a first format into a second video signal of a second format so that a relative position of first auxiliary data in said first format is lost;

a first converter for converting a first auxiliary data packet that has been separated from the video signal of the first format, the first auxiliary data packet consisting of 10 bits/N words including auxiliary data and check sum data, into an auxiliary data packet of a second format of 8 bits/N words, the auxiliary data packet of the second format including lower 8 bits, the auxiliary data packet of the second format including the auxiliary data, the check sum data, a line number and a valid/invalid flag, the line number indicating the relative position, the valid/invalid flag indicating that the location data is valid or invalid such that when the location data is valid the first auxiliary data packet is to be multiplexed at a first location in the video signal of the first format based on the line number and when the location data is invalid the first auxiliary data packet is to be multiplexed at a second location in the video signal of the first format determined regardless of the line number; and a second converter for generating check sum data of 10 bits from check sum data in the auxiliary data packet of the second format and bit data of check sum data calculated with using auxiliary data in the auxiliary data packet of the second format, and for converting the auxiliary data packet of the second format that has been separated from the video signal of the second format into the first auxiliary data packet with using the generated check sum data of 10 bits.

18. A method of processing a signal, comprising the steps of:

converting a video signal of a first format into a second video signal of a second format so that a relative position of first auxiliary data in said first format is lost;

generating a second auxiliary data packet including second data and a second header carrying location data and a valid/invalid flag, the location data indicating said relative position of said first auxiliary data in said first format, the valid/invalid flag indicating that the location data is valid or invalid such that when the location data is valid the first auxiliary data is to be multiplexed at a first location in the video signal of the first format based on the location data carried by the second header and when the location data is invalid the first auxiliary data is to be multiplexed at a second location in the video signal of the first format determined regardless of the location data carried by the second header; and multiplexing the second auxiliary data packet in the video signal of the second format.

19. A method according to claim 18, wherein the location data is a line number of a line of the video signal of the first format in which the first auxiliary data packet is multiplexed according to an order of priority of the first auxiliary data packet.

20. A method according to claim 18, wherein the location data includes a line number of a predetermined line in the video signal of the first format.

21. A method according to claim 18, wherein the location data includes data indicating an arbitrary line in an auxiliary data area of the video signal of the first format.

22. A method according to claim 18, wherein the location data includes a location where a first auxiliary data packet including a first header and first data is multiplexed in the video signal of the first format.

23. A method according to claim 22, wherein each of the first header and the first data includes a word consisting of 10 bits, wherein each of the second header and the second data includes a word consisting of 8 bits, and wherein the second data includes eight least bits of the first data.

24. A method of processing a signal, comprising the steps of:

converting a video signal of a first format into a second video signal of a second format so that a relative position of first auxiliary data in said first format is lost;

generating location data indicating said relative position of said first auxiliary data in said first format;

generating a second auxiliary data packet including a second header and second auxiliary data carrying the first data, the second header carrying the location data and a valid/invalid flag, the valid/invalid flag indicating that the location data is valid or invalid such that when the location data is valid the first auxiliary data is to be multiplexed at a first location in the video signal of the first format based on the location data carried by the second header and when the location data is invalid the first auxiliary data is to be multiplexed at a second location in the video signal of the first format determined regardless of the location data carried by the second header; and multiplexing the second auxiliary data packet in a video signal of a second format converted from the first format.

25. A method according to claim 24, wherein the location data includes a location where a first auxiliary data packet including a first header and first data is multiplexed in the video signal of the first format.

26. A method according to claim 25, further comprising the steps of:
measuring a total amount of data of the first auxiliary data packet, and
when the total amount of the data is greater than an amount of data to be multiplexed in the video signal of the second format, multiplexing overflow data indicating an overflow of the total amount of the data to be multiplexed in the video signal of the second format.

27. A method according to claim 25, wherein the location data includes data indicating an arbitrary line in the auxiliary data area of the video signal of the first format.

28. A method according to claim 25,
wherein each of the first header and the first data includes a word consisting of 10 bits,
wherein each of the second header and the second data includes a word consisting of 8 bits, and
wherein the second data includes eight least bits of the first data.

29. A method according to claim 20, wherein the location data includes a line number of a predetermined line in the video signal of the first format.

30. A method of processing a signal, comprising the steps of:
restoring a video signal of a first format from a second video signal of a second format, the video signal of the first format having previously been converted into the second signal of the second format so that a relative position of first auxiliary data in said first format was lost;
separating a second auxiliary data packet from an auxiliary data area of the video signal of the second format, the second auxiliary data packet including second data and a second header, the second header carrying location data and a valid/invalid flag, the location data indicating the relative position of the first auxiliary data in the first format, the valid/invalid flag indicating that the location data is valid or invalid such that when the location data is valid the first auxiliary data is to be multiplexed at a first location in the video signal of the first format based on the location data carried by the second header and when the location data is invalid the first auxiliary data is to be multiplexed at a second location in the video signal of the first format determined regardless of the location data carried by the second header;
generating a first auxiliary data packet from the second data, the first auxiliary data packet including a first header and first data multiplexed in the video signal of the first format; and
multiplexing the first auxiliary data packet in the video signal of the first format converted from the second format according to the location data when the valid/invalid flag indicates the location data is valid.

31. A method according to claim 30, further comprising the step of:
when an auxiliary data packet to be multiplexed in a predetermined line is detected, multiplexing the auxiliary data packet in the predetermined line.

32. A method according to claim 30, further comprising the steps of:
generating the first data from the second data, the first header and the first data each including a word consisting of 10 bits, the second header and the second data each including a word consisting of 8 bits; and
generating the first auxiliary data packet including the first header and the first data by adding the first header.

33. A method according to claim 30, further comprising the step of multiplexing the first auxiliary data packet in the video signal of the first format converted from the second format, regardless of the location data, when the valid/invalid flag indicates the location data is invalid.

34. A method of processing a signal, comprising the steps of:
converting a video signal of a first format into a second video signal of a second format so that a relative position of first auxiliary data in said first format is lost;
converting a first auxiliary data packet that has been separated from the video signal of the first format, the first auxiliary data packet consisting of 10 bits/N words including auxiliary data and check sum data, into an auxiliary data packet of a second format of 8 bits/N words, the auxiliary data packet of the second format including the auxiliary data, the check sum data, a line number and a valid/invalid flag, the line number indicating the relative position, the valid/invalid flag indicating that the location data is valid or invalid such that when the location data is valid the first auxiliary data is to be multiplexed at a first location in the video signal of the first format based on the line number and when the location data is invalid the first auxiliary data is to be multiplexed at a second location in the video signal of the first format determined regardless of the line number;
converting the auxiliary data packet that has been separated from the video signal of the second format into the first auxiliary data packet of the first format using a generated check sum data of 10 bits.

35. An apparatus for processing a multiplexed signal, said multiplexed signal including a video signal in a first format and first auxiliary data, said apparatus comprising:
an encoder for changing the video signal from the first format to a second format so that a relative position of the first auxiliary data in said first format is lost;
a line number generator for generating location data for indicating said relative position of said first auxiliary data in said first format;
a data generator for generating second auxiliary data from the first auxiliary data and a valid/invalid flag indicating that the location data is valid or invalid such that when the location data is valid the first auxiliary data is to be multiplexed at a first location in the video signal of the first format based on the location data and when the location data is invalid the first auxiliary data is to be multiplexed at a second location in the video signal of the first format determined regardless of the location data and for transmitting said second auxiliary data and said location data to a multiplexer; and wherein
said multiplexer multiplexes the video signal in the second format, the location data, and the second auxiliary data.

36. An apparatus for processing a multiplexed signal, said multiplexed signal including a video signal in a first format and first auxiliary data, said apparatus comprising:
an encoder for changing the video signal from the first format to a second format so that a relative position of first auxiliary data in said first format is lost;

a location data generator for generating location data for indicating said relative position of said first auxiliary data in said first format;

a data generator for generating second auxiliary data from the first auxiliary data and a valid/invalid flag indicating that the location data is valid or invalid such that when the location data is valid the first auxiliary data is to be multiplexed at a first location in the video signal of the first format based on the location data and when the location data is invalid the first auxiliary data is to be multiplexed at a second location in the video signal of the first format determined regardless of the location data; and wherein a multiplexer for multiplexing the video signal in the second format, the location data, and the second auxiliary data.

* * * * *

UNITED STATES PATENT AND TRADEMARK OFFICE
CERTIFICATE OF CORRECTION

PATENT NO. : 7,400,820 B2  Page 1 of 1
APPLICATION NO. : 10/127863
DATED : July 15, 2008
INVENTOR(S) : Uchida et al.

It is certified that error appears in the above-identified patent and that said Letters Patent is hereby corrected as shown below:

At Column 11, line 26. "according to claim 20," should read --according to claim 24,--

Signed and Sealed this

Seventh Day of October, 2008

JON W. DUDAS
*Director of the United States Patent and Trademark Office*